(12) United States Patent
Gresset

(10) Patent No.: US 10,893,416 B2
(45) Date of Patent: Jan. 12, 2021

(54) METHOD FOR WIRELESS NETWORK MONITORING AND NETWORK NODE FOR IMPLEMENTING THE SAME

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 31 days.

(21) Appl. No.: 16/077,198

(22) PCT Filed: Mar. 29, 2017

(86) PCT No.: PCT/JP2017/014163
§ 371 (c)(1),
(2) Date: Aug. 10, 2018

(87) PCT Pub. No.: WO2017/179462
PCT Pub. Date: Oct. 19, 2017

(65) Prior Publication Data
US 2020/0120510 A1    Apr. 16, 2020

(30) Foreign Application Priority Data

Apr. 12, 2016 (EP) .................................... 16305429

(51) Int. Cl.
*H04W 16/14* (2009.01)
*H04W 4/42* (2018.01)
(Continued)

(52) U.S. Cl.
CPC ......... *H04W 16/14* (2013.01); *B61L 27/0005* (2013.01); *B61L 27/0077* (2013.01);
(Continued)

(58) Field of Classification Search
CPC ....... H04W 16/14; H04W 4/42; H04W 8/005; H04W 24/04; H04W 24/08; H04W 64/006; B61L 27/0005; B61L 27/0077
See application file for complete search history.

(56) References Cited

U.S. PATENT DOCUMENTS

2002/0147566 A1* 10/2002 Kuwahara ................. G01S 5/14
                                                        702/150
2011/0246148 A1* 10/2011 Gupta .................... H04W 64/00
                                                        703/2
(Continued)

FOREIGN PATENT DOCUMENTS

EP    2 688 351 A1    1/2014
EP    2916604 A1    9/2015

OTHER PUBLICATIONS

Zhu et al. "Design and Performance Enhancements in Communication-Based Train Control Systems With Coordinated Multipoint Transmission and Reception", IEEE Transactions On Intelligent Transportation Systems, vol. 15, No. 3, Jun. 1, 2014, pp. 1258-1272.
(Continued)

*Primary Examiner* — Dinh Nguyen
(74) *Attorney, Agent, or Firm* — Birch, Stewart, Kolasch & Birch, LLP

(57) ABSTRACT

A method for monitoring transmission in a wireless network comprising a radio access infrastructure and wireless devices, is provided. The method comprises: generate an estimated number of wireless devices according to a predetermined profile of number of wireless devices; generate an estimated trajectory of each of the estimated number of wireless devices according to a predetermined profile of trajectories; for each wireless device of the estimated number of wireless devices, determine an estimated distribution of the probabilities of radio transmission error during a time window using the estimated trajectory of the wireless
(Continued)

device; and determine an estimate of a figure of merit of the wireless network based on the respective estimated distributions of the probabilities of radio transmission error during the time window for the wireless devices.

12 Claims, 7 Drawing Sheets

(51) Int. Cl.
    *B61L 27/00*     (2006.01)
    *H04W 8/00*     (2009.01)
    *H04W 24/04*     (2009.01)
    *H04W 24/08*     (2009.01)
    *H04W 64/00*     (2009.01)

(52) U.S. Cl.
    CPC ............ *H04W 4/42* (2018.02); *H04W 8/005* (2013.01); *H04W 24/04* (2013.01); *H04W 24/08* (2013.01); *H04W 64/006* (2013.01)

(56) References Cited

U.S. PATENT DOCUMENTS

2014/0043983 A1*   2/2014   Huang ................ H04L 41/0677
                                                                    370/244
2015/0333993 A1*  11/2015  Welin .................... H04W 24/08
                                                                    370/252

OTHER PUBLICATIONS

Office Action dated Jul. 15, 2020 in corresponding Indian Application No. 201847035249.

* cited by examiner

METHOD FOR WIRELESS NETWORK MONITORING AND NETWORK NODE FOR IMPLEMENTING THE SAME

TECHNICAL FIELD

The present disclosure relates to the field of wireless network monitoring, in particular the monitoring of the quality of wireless transmissions in a Communication Based Train Control (CBTC) system.

BACKGROUND ART

Wireless networks operated on CBTC systems have recently been designed for using public radio frequency bands in order to decrease the cost of using radio resources. In particular, the use of the ISM (Industrial, Scientific and Medical) frequency bands has been considered for wireless networks deployed in CBTC systems. With the sharing of the frequency resource with other systems (e.g. WiFi hotspots, microwave equipment), radio transmissions in CBTC wireless networks may suffer from interferences with such external systems.

Indeed, the public band is shared with other devices that can generate interference in the downlink (wireless network infrastructure to terminal equipment) or in the uplink (terminal equipment to wireless device infrastructure). When the available resources are too severely impacted by interference, many transmissions of messages may fail. However, in some CBTC systems, if no message is received in the uplink or in the downlink during a predetermined time period (typically between 1 s and 1.5 s) for at least one train, the CBTC management system generates a train stop.

Because a train stop will impact the traffic of several trains, traffic operator will usually set as a CBTC system robustness objective that a train stop should not occur more than once a year, once every 10 years, or even once every 20 years. Such strong robustness objectives have led to the development of technologies aimed at reducing the number of train stops in a given time frame. For example, dynamically choosing the transmission resource according to a database of interference measurements, which can be for example updated with measurements at each new train travel, allows for drastically reducing the amount of train stops. However, conventional technologies have some limitations in that it cannot be guaranteed that extremely binding situations of interference (for example, in the case of a system using the ISM band, caused by a WiFi hotspot installed at close proximity of a wireless access point of the system) will be overcome.

SUMMARY OF INVENTION

There is therefore a need for providing a method for wireless monitoring and a network node implementing the same that address the above-described drawbacks and shortcomings of the conventional technology in the art.

It is an object of the present subject disclosure to provide an improved method for wireless monitoring and network node implementing the same.

Another object of the present subject disclosure is to provide an improved method for wireless monitoring and network node implementing the same for alleviating the above-described drawbacks and shortcomings of conventional wireless monitoring schemes.

Yet another object of the present subject disclosure is to provide an improved method for wireless monitoring and network node implementing the same for ensuring compliance with wireless network robustness requirements with respect to data transmission failure.

To achieve these objects and other advantages and in accordance with the purpose of the present subject disclosure, as embodied and broadly described herein, in one aspect of the present subject disclosure, a method for monitoring transmission in a wireless network comprising a radio access infrastructure and wireless device is proposed. The method comprises: generate an estimated number of wireless devices according to a predetermined distribution of number of wireless devices; generate an estimated trajectory of each of the estimated number of wireless devices according to a predetermined distribution of trajectories; for each wireless device of the estimated number of wireless devices, determine an estimated distribution of the probabilities of radio transmission error during a time window using the estimated trajectory of the wireless device; and determine an estimate of a figure of merit of the wireless network based on the respective estimated distributions of the probabilities of radio transmission error during the time window for the wireless devices.

The estimated figure of merit can advantageously be used as a measure of the system health, so that corrective actions may be taken for improving such system health.

In some embodiments, the figure of merit may measure a probability of occurrence of a radio transmission error in the wireless network during the time window. Such a figure of merit may advantageously be used for monitoring the radio failures in the wireless network, such as a CBTC wireless network, and in particular monitor the train stop events.

In some embodiments, the length of the time window may be chosen between 0.5 second and 2 seconds. The length of the time window may advantageously be chosen to coincide or correspond to the time window based on which a train stop event is triggered in a CBTC system.

In some embodiments, the determining an estimate of a figure of merit of the wireless network may comprise: generate an estimated probability of radio transmission error during the time window according to the estimated distribution of the probabilities of radio transmission error during the time window; and execute a resource allocation algorithm used to allocate resources in the wireless network on the generated estimated probability of radio transmission error during the time window.

In some embodiments, the method for monitoring transmission in a wireless network may further comprise the determining an estimate of a distribution of the figure of merit by iterating the above method. Such a distribution of the figure of merit may advantageously be used as a prediction tool for undesired events. The prediction of such undesired events (e.g. train stop events) can then be used for identifying corrective measures as specific cures to undesired events designed before an occurrence of such event. This may be done in some embodiments through identifying parameters (using a statistical analysis of the system) that are aggravating for the system, such as, for example, locations in the network coverage where the most interference occurs.

In some embodiments, the determining the estimate of a number of wireless devices may be based on an estimate of a probability density function model of the number of wireless devices.

In some embodiments, the determining the respective estimates of trajectory may be based on an estimate joint probability density of the position and speed of each of the wireless devices.

In some embodiments, the determining the respective estimates of trajectory may be based on a distribution of trajectories according to which the location of each mobile unit remains the same over the time window.

In some embodiments, the wireless network is comprised in a Communication Based Train Control, CBTC, system, and the wireless devices are onboard trains, and the method may further comprise: determining an estimate probability of train stop distribution based on the estimate of a distribution of the figure of merit, wherein a train stop is triggered for an occurrence of a radio transmission error in the wireless network during the time window. Such estimate probability of train stop distribution can be used to provide a prediction of train stop events, which allows for designing a specific cure to each undesired situation in advance. The present subject disclosure therefore provides a prediction and monitoring of the radio failures in a CBTC radio environment.

In some embodiments, an interference database may be built that estimates a quantization of the radio condition with respect to the wireless devices' locations. The quality of the transmission can be seen as the result of several factors including the trains' positions and the resource allocation algorithm. Thus, for a given realization of the interference, the performance drastically changes when the positions and number of trains to be served in a cell change. In order to accurately predict the train stop probability in the cell, the system may statistically consider all possible deployment scenarios. Since the number of possibilities, including the resource allocation strategy, the interference realization, the number of trains and their position, is enormous, the present subject disclosure advantageously defines a methodology for estimating a metric representative of the train radio condition, and to design a threshold above which an alert occurs.

That is, in such embodiments, the method may further comprise: determining an estimate probability distribution of an expected time to the next train stop, computing a target probability of train stop value using the estimate probability distribution of an expected time to the next train stop, and generating an alert responsive to the target probability of train stop value being beyond a predefined threshold value.

In addition, or alternatively, and also in such embodiments, the method may further comprise: determining an estimate probability distribution of an expected time to the next train stop, computing a target probability of train stop value using the estimate probability distribution of an expected time to the next train stop, and determining a critical number of trains for which a probability of having a train stop probability equal to the target probability of train stop value is beyond a predefined threshold value.

The present subject disclosure also advantageously provides schemes for identifying the main causes of train stop events. Since a train stop can be caused by the effect of many different events, it is of interest to filter the ones in common for every train stop event. Advantageously, this filtering out may include computing the probability of participation of a cause (e.g., a given train position, a number of trains) in the possible train stop events. From this information, one may select a cure/countermeasure, such as, for example, proposing to deploy a new WRU, limiting the number of trains per cell, their minimal speed in a given position cluster, etc.

In another aspect of the present subject disclosure, a network node in a wireless network comprising a processor, a memory, operatively coupled to the processor, wherein the network node is configured to perform any of the proposed methods for monitoring transmission according to the present subject disclosure, is proposed.

In yet another aspect of the present subject disclosure, a non-transitory computer-readable medium encoded with executable instructions which, when executed, causes a network node comprising a processor operatively coupled with a memory, to perform any of the proposed methods for monitoring transmission according to the present subject disclosure, is proposed.

In yet another aspect of the present subject disclosure, a computer program product comprising computer program code tangibly embodied in a computer readable medium, said computer program code comprising instructions to, when provided to a computer system and executed, cause said computer to perform any of the proposed methods for monitoring transmission according to the present subject disclosure, is proposed.

In yet another aspect of the present subject disclosure, a data set representing, for example through compression or encoding, such a computer program, is also proposed.

It should be appreciated that the present invention can be implemented and utilized in numerous ways, including without limitation as a process, an apparatus, a system, a device, and as a method for applications now known and later developed. These and other unique features of the system disclosed herein will become more readily apparent from the following description and the accompanying drawings.

The present subject disclosure will be better understood and its numerous objects and advantages will become more apparent to those skilled in the art by reference to the following drawings, in conjunction with the accompanying specification.

DESCRIPTION OF EMBODIMENTS

Figure 1:
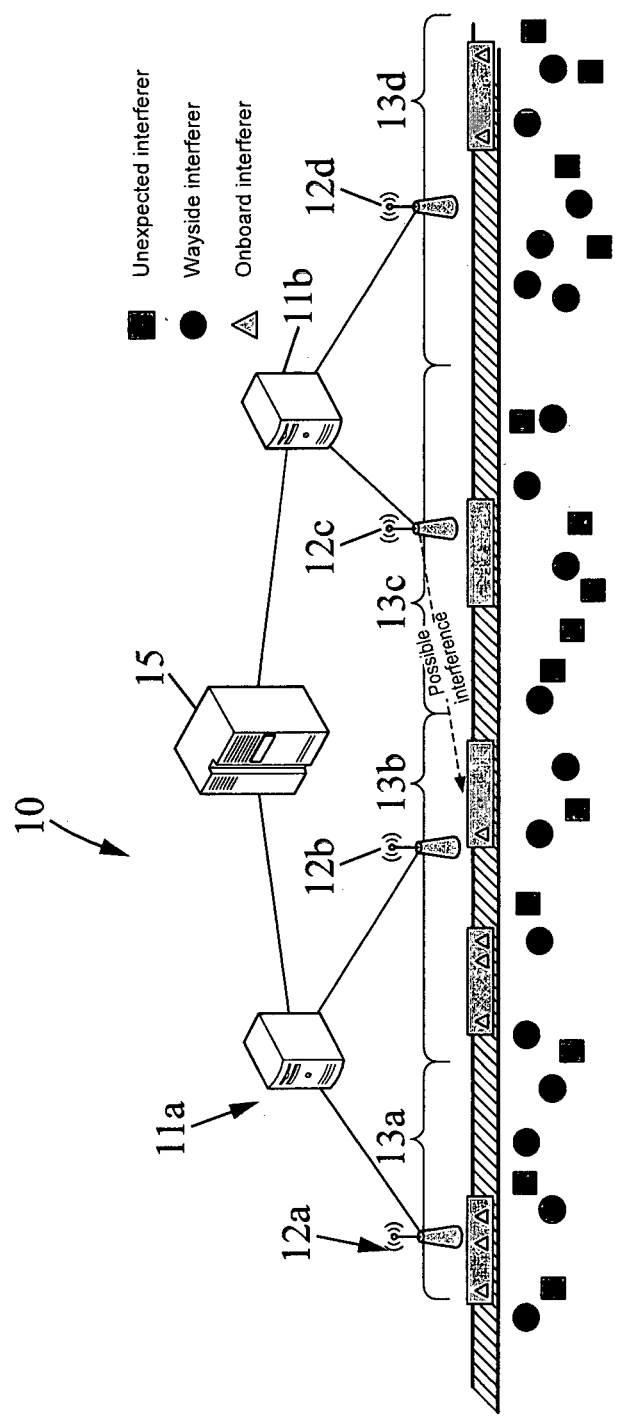
FIG. 1 is a schematic diagram illustrating an exemplary CBTC network, in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms «memory» and «computer storage media" include any type of data storage device, such as, without limitation, a hard drive, a flash drive or other flash memory devices (e.g. memory keys, memory sticks, key drive), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium from that can be used to carry or store program code in the form of instructions or data structures which can be read by a computer processor, or a combination thereof. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Visual Basic, SQL, PHP, and JAVA.

Unless specifically stated otherwise, it will be appreciated that throughout the following description discussions utilizing terms such as processing, computing, calculating, determining, or the like, refer to, the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

In the following description and claims, the terms "coupled" and "connected", along with their derivatives, may be used. In particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

As used herein, the term "message" may include a unit of data that may be routed or transmitted between nodes or stations or across a network, and may include frames, protocol data units or other units of data.

It should be understood that embodiments of the present subject disclosure may be used in a variety of applications. Although the present invention is not limited in this respect, the method for monitoring transmission in a wireless network disclosed herein may be used in many apparatuses such as in any network node of a wireless network or in a Operation and Maintenance center of a wireless network. For clarity, the following description focuses on wireless networks providing wireless transmissions for the control of wireless devices onboard train units or the like, such as CBTC wireless networks. However, technical features of the present invention are not limited thereto.

As used herein, the terms "wireless device" may be used to indicate any device, fixed or mobile, capable of wireless communication with a network node of a wireless infrastructure network, and, depending on the wireless network, may be referred to as a mobile station (MS), a mobile terminal (MT), a mobile equipment, a user terminal, a subscriber station, a user equipment (UE), an onboard unit (OBU), etc. A wireless device may support voice and data communication, only voice communication, or only data communication, such as an Machine-to-Machine (M2M) device.

As used herein, the terms "access point" may be used to indicate a fixed network node of a wireless infrastructure network, capable of wireless communication with a wireless device, and, depending on the wireless network, may be referred to as a base station (BS), a base transceiver station (BTS), a Node-B, an evolved Node-B (eNB), a Wayside Radio Unit (WRU), etc.

FIG. 1 illustrates an exemplary CBTC wireless network 10 comprising a server 15 connected to Wayside Radio Units (WRUs) 11a-11b, each of which is connected to Wayside Transmission Units (WTUs) 12a, 12b, 12c, 12d. The WTUs manage wireless transmission in respective geographical coverage areas, called cells 13a, 13b, 13c, 13d, which may be partially overlapping to provide seamless handover between two neighboring cells.

It will be appreciated by those having ordinary skill in the relevant art that any suitable network topology, such as, for example, a ring topology or a mesh topology, may be used in place of the tree topology for network 10 which is given by way of example only. Likewise, any suitable network functional architecture may be used in place of the architecture of network 10 which is given by way of example only.

FIG. 1 also shows trains located in the cells, which embed respective wireless communication equipment known as onboard units (OBU) capable of wireless communications with WRUs through WTUs in the corresponding cell.

It will be appreciated by those having ordinary skill in the relevant art that any suitable communication link, such as, for example, wireless communication links, may be used in place of the wireline communication links between the WTUs and the WRUs, and/or between the WRUs and the server, which are given by way of example only.

As shown in FIG. 1, several types of interferer may disrupt wireless communications between OBUs and WRUs, including interferers external to the wireless network which are on-board the trains, interferers of the wireless network 10, and interferers external to the wireless network which are not on-board the trains, for example located along the train track 14.

In some embodiments, the server 15 may operate a mission critical service and the communication network 10 may be configured for controlling several terminals. For example, in the case of CBTC (Communication Based Train Control), the terminals are located onboard trains and are in communication with a server. If a communication link between the server and a train or a train and the server fails during a pre-determined amount of time (typically 1 second or 1.5 second), the application layer of the CBTC system may be configured so that a train stop is requested by the CBTC system application layer. The failure of the communication link may result from various causes, including bad radio condition or interference when wireless transmission technologies are used, but also result from system overload (for example in circumstances where too many trains happen to be located at some point of time in a same area).

Some systems may be configured so that one train stop leads to an immediate stopping of all the trains operated by the system in a given geographical area, even in the whole railroad system. From this standpoint, a figure of merit of the system may be defined as the probability that a train stop occurs in a predetermined geographical area, which typically is a geographical area covered by the communication network 10 and managed by the server 15, for example a geographical area corresponding to a train line, a train line section, managed by a CBTC server application layer.

In some embodiments, as illustrated on FIG. 1, such a geographical area covered by the communication network 10 and managed by the server 15 is partitioned into smaller area units, typically cells 13a, 13b, 13c, 13d, the radio infrastructure being deployed so that radio coverage is provided in a cell 13a, 13b, 13c, 13d by a radio infrastructure unit which may be called a Wayside Transmission Unit 12a, 12b, 12c, 12d, while the cell is managed by a radio infrastructure unit which may be called a Wayside Radio Unit 11a, 11b connected to the corresponding WTU.

In one or more embodiments, the radio infrastructure unit managing the cell, and in particular controlling the radio resources used in the cell, may be capable of dynamically allocate radio resources used in the cell, so as to dynamically parameterize the radio transmissions in the cell. The radio infrastructure units of the communication network 10 may be configured so that such dynamic radio resource management is performed at each WRU, independently from the others. In such networks, error events due to communication link failure may be considered independently from one cell to the other, so that the performance of the system from the standpoint of communication link failure and/or train stops may be evaluated by considering the performance in each cell.

In some embodiments, the performance of the system in a cell may be expressed using a figure of merit which measures an estimate probability of train stop, that is, an estimate probability of a transmission error occurring during a time window.

Such figure of merit will depend on variables, such as the number of trains in the cell during the time window, their trajectories, and the radio resource allocation scheme used for the radio transmissions.

If it was be possible to know all the possible configurations of train trajectories and compute the system performance for each of them, an estimation of the distribution of the figure of merit would be possible. However, it is not possible to know all the configurations of train trajectories. The present subject disclosure therefore proposes to determine an approximation that estimates the distribution of the figure of merit. Once an estimate distribution of the figure of merit is determined, relevant information, such as a critical number of trains, critical areas, and/or a system alert can be extracted from this estimate for the maintenance of the system and improvement of the robustness thereof.

A simple yet inaccurate scheme to build the probability distribution of the train stops in the system would be to memorize all the realizations of said train stops and to build the estimated probability distribution from it. However, when performing the analysis of the low probabilities of error (e.g., close to $10^{-10}$), the required amount of measurements for accurately characterizing the behaviour of the system would be too large. Indeed, in a system in which a train stop occurs on average every week, building the estimated probability distribution would be possible based on the train stop occurrences. Such is not the same in a system in which a train stop occurs every 10 years, and the robustness objective is to modify the system so that the probability that a train stop occurs every 20 years is very low, for example less than 10%.

Instead the present subject disclosure proposes to consider independently subsets of random variables identified as being involved in the random process of the figure of merit, in order to more accurately perform an estimation of rare events, such as train stops in CBTC systems, and obtain a good accuracy with a drastically lower amount of measurements. For example, as will be described below, the two subsets of random variables (number of trains; positions of trains) and (channel fading; interference) can be considered independently to determine an estimation of a probability of train stop occurrence in a CBTC system. This allows for updating the system over time and tracking potential changes in the system performance. As discussed below, such decomposition also has the advantage of decomposing the problem according to important variables that can be used for monitoring the radio system health.

The random variables that can be considered for characterizing a figure of merit determined over a time window, for example that measures a probability of occurrence of a radio transmission error in the wireless network during the time window, may be the transmission error distribution for each radio resource for each location, the number of wireless devices and their trajectories within the time window. The figure of merit may be considered as a function of realizations of these random variables that takes into account the resource allocation strategy.

Figure 2:
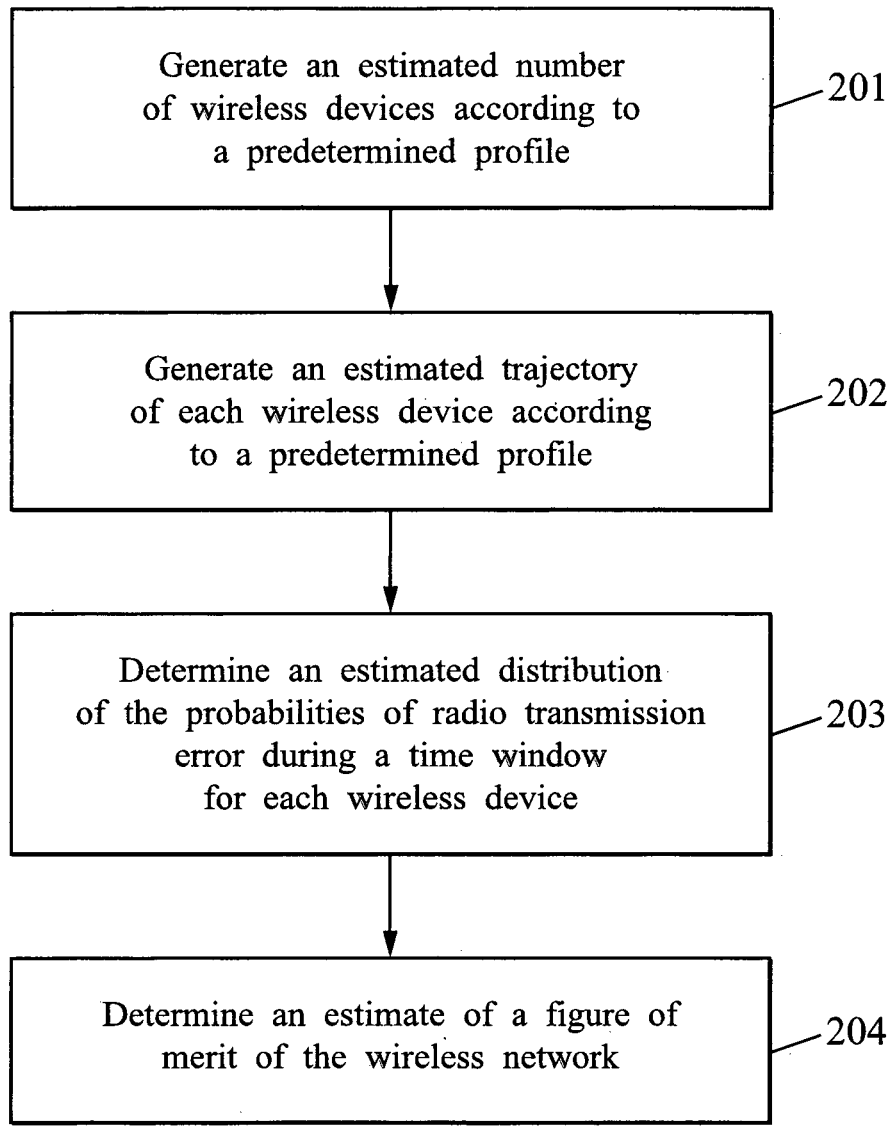
FIG. 2 is a flow chart illustrating an exemplary network monitoring process, in accordance with one or more embodiments.

FIG. 2 shows a method for monitoring transmission in a wireless network comprising a radio access infrastructure and wireless devices according to embodiments of the present subject disclosure.

An estimated number of wireless devices is generated (201) according to a predetermined profile of number of wireless devices. Depending on the embodiment, the profile of number of wireless devices can be derived from a probabilistic model, for example by determining an estimate probability distribution of the number of wireless devices based on a probabilistic model, or can be derived from a statistical analysis of measurements made on the system over time.

An estimated trajectory for each wireless device (among the estimated number of wireless devices) is generated (202) according to a predetermined profile of trajectories. Depending on the embodiment, the profile of trajectories can also be derived from a probabilistic model, or from a statistical analysis of measurements made on the system over time. In addition, the set of potential locations of a wireless device of the network may be quantized into clusters of position, and a trajectory of a wireless device can be modelled by a starting cluster corresponding to the cluster in which the wireless device is located at the start of the time window, and a wireless device speed. In some embodiments, a joint probability density function of the wireless device trajectories is evaluated and updated using observations of the wireless devices moving in the system. In other embodiments, each wireless device is assumed to stay in the same cluster during the time window. Such assumption can for example correspond to models in which clusters are defined to be large geographical areas, with wireless devices having a low peek speed as compared to the size of a cluster. This may be the case for example in a suburban train system, which may cover a large geographical area (around a large city) while being operated with trains having a low speed in comparison to inter-city trains.

In the exemplary case where the wireless network is a CBTC network, with the wireless devices being onboard trains, the predetermined profile of trajectories may further include predetermined paths defined by the train tracks along which the CBTC network is deployed.

An estimated distribution of the probabilities of radio transmission error during a time window is then determined (203) for each wireless device of the estimated number of wireless devices using the estimated trajectory of the wireless device, and an estimate of a figure of merit of the wireless network is determined (204) based on the respective estimated distributions of the probabilities of radio transmission error during the time window for the wireless devices.

The determination of an estimated distribution of the probabilities of radio transmission error during a time window is described hereinafter.

As discussed above, the geographical area over which the system performance are measured can be partitioned in cells, and the system performance may be considered in some embodiments with respect to geographical areas, each corresponding to a cell of the wireless network.

Parameters describing the radio transmissions occurring in such a cell over an observation time window (for example of length 1 s, 1.5 s, or 2 s) may be defined as follows:

N represents the total number of communications links concurrently established between the trains in the cell and the server 15. Each communication link is assumed to correspond to one train, and have a link direction which is either uplink or downlink. Referring to the exemplary network of FIG. 1, uplink communications correspond to transmissions from the OBUs to the server 15, and downlink communications correspond to transmissions in the reverse direction, that is, from the server 15 to the OBUs.

A model associating the number of communication links with the number of trains in the cell may be adopted, so as to consider the number of communication links which may be established altogether. For example, the N parallel communications links $\{CL_j\}_{j=1, \ldots, N}$ may for instance be divided in N/2 communication links established in downlink, and N/2 communication links established in uplink, therefore assuming that N/2 trains are located in the cell.

For the j-th parallel communication link $CL_j$, n(j) represents the number of message transmission attempts made during the time window.

Each of these message transmission attempts $\{CL_j\_Message_i\}_{i=1, \ldots, n(j)}$ is made using an allocated radio transmission resource of index rad_res(j, i).

Depending on the embodiment, the radio resource may be defined by a portion of time, which may also be referred to, depending on the wireless network physical layer architecture, as a "time slot", or a "transmission time interval (TTI)", and a frequency band or sub-band of the frequency band used by the transmission system in the time window.

PTE(j, rad_res(j, i)) represents a probability of transmission error for the i-th message transmission attempt on the j-th parallel communication link $CL_j\_Message_i$ using the allocated radio transmission resource rad_res(j, i), for example consecutive to the radio communication channel fluctuations, interference, and/or mobile wireless device positions.

The communication links being different from each other (in particular in that they have different fading and path gain), each communication link corresponds to a respective probability of transmission error, even when the same radio transmission resource is used. The probability of transmission error may therefore be considered for each parallel communication link, leading to the definition of a function PTE(j, v) representing the probability of transmission error for a radio transmission on the j-th parallel communication link $CL_j$ using radio transmission resource of index v in a set of radio transmission resources that can be allocated to the radio transmission on the j-th parallel communication link $CL_j$.

A figure of merit, noted $f(.)$, may then be defined to represent a combination of probabilities of transmission error PTE(j, v) within the observation time window.

In some embodiments, a figure of merit that represents a probability of occurrence of a transmission error (on any of the N parallel communication links) in the wireless network over the observation time window may be defined as a function $f(.)$ of the set $\{\{PTE(j, rad\_res(j, i))\}_{i=1, \ldots, n(j)}\}_{j=1, \ldots, N}$ of sets $\{PTE(j, rad\_res(j, i))\}_{i=1, \ldots, n(j)}$ of the probability of transmission error on the j-th parallel communication link $CL_j$ for which radio resource rad_res(j, i) has been allocated.

An exemplary definition of such a figure of merit $f(.)$ s provided by the following Equation 1:

$$f\left(\{\{PTE(j, \text{rad\_res}(j, i))\}_{i=1,\ldots,n(j)}\}_{j=1,\ldots,N}\right) =$$

$$1 - \prod_{j=1}^{N}\left[1 - \prod_{i=1}^{n(j)} PTE(j, \text{rad\_res}(j, i))\right]$$

In the above Equation, $\Pi_{i=1}^{n(j)} P(j, \text{rad\_res}(j, i))$ represents the probability of transmission error on the j-th parallel communication link $CL_j$, so $1-\Pi_{i=1}^{n(j)} P(j, \text{rad\_res}(j, i))$ represents the probability that there is no transmission error for the transmission of the n(j) messages on the j-th parallel communication link $CL_j$.

As $\Pi_{j=1}^{N}[1-\Pi_{i=1}^{n(j)}P(j, \text{rad\_res}(j, i))]$ measures the probability that there is no transmission error on any of the N parallel communication links, the above-defined figure of merit $f(\{\{PTE(j, \text{rad\_res}(j, i))\}_{i=1,\ldots,n(j)}\}_{j=1,\ldots,N})$ measures the probability that there is at least one transmission error on at least one of the N parallel communication links, that is, a probability of occurrence of a transmission error (on any of the N parallel communication links) in the wireless network over the observation time window.

In specific embodiments wherein the performance of the system is determined by measuring the probability of occurrence of a train stop, the above-defined figure of merit $f(\{\{PTE(j, \text{rad\_res}(j, i))\}_{i=1,\ldots,n(j)}\}_{j=1,\ldots,N})$ may be used to measure a probability that a train stop occurs in a geographical area (corresponding, in the present example, to a cell).

The notation $\{\{(PTE(j, \text{rad\_res}(j, i))\}_{i=1,\ldots,n(j)}\}_{j=1,\ldots,N}$ represents a set of sets since each parallel transmission does not necessarily have the same radio resource allocation (such radio resource allocations may be represented by an index of a radio resource allocated for the transmission) within the considered time window. For example, with two trains being located in the geographical area (N=2), in a case where 5 radio resources are available for transmission of message during the time window, the first train may have 5 probabilities of transmission error {0.1, 0.2, 0.3, 0.4, 0.5} respectively corresponding to 5 radio resources used for transmissions of message during the time window, and the second train may have 5 different probabilities of transmission error {0.15, 0.25, 0.35, 0.45, 0.55}, also respectively corresponding to the 5 radio resources used for transmissions of message during the time window. The radio resource rad_res(j, i) used for each transmission of message on the j-th parallel communication link $CL_j$_Message$_i$ may be allocated as a result of a dynamic resource allocation scheme, or else a deterministic resource allocation scheme. For example {{1,2}, {3,4,5}} would indicate that there are two parallel transmissions occurring during the considered time window (N=2), the first one being allocated the resource indexes 1 and 2, and the second one being allocated the resource indexes 3,4 and 5. Using the rad_res(j, i) notation, this would mean that rad_res(j=1, i=1)=1, rad_res(j=1, i=2)=2, rad_res(j=2, i=1)=3, rad_res(j=2, i=2)=4, and rad_res(j=2, i=3)=5. Given the above exemplary probabilities of transmission error, the respective PTE(j, rad_res(j, i)) would have the following values: PTE(j=1, rad_res(j=1, i=1))=0.1, PTE(j=1, rad_res(j=1, i=2))=0.2, PTE(j=2, rad_res(j=2, i=1))=0.35, PTE(j=2, rad_res(j=2, i=2))=0.45, and PTE(j=2, rad_res(j=2, i=3))=0.55.

This would lead to a set of sets {{0.1, 0.2}; {0.35, 0.45, 0.55}} where n(1)=2 and n(2)=3, from which a figure of merit value can be determined as: 1−(1−0.1×0.2)×(1−0.35× 0.45×0.55)=0.1048925.

In embodiments where a deterministic resource allocation scheme is used, the radio resource rad_res(j, i) used for the transmission of message on the j-th parallel communication link $CL_j$_Message$_i$ has been pre-determined, whereas the network 10 may use, in other embodiments, a dynamic resource allocation scheme such as the one described below. It will be appreciated by those having ordinary skill in the relevant art that any suitable dynamic resource allocation scheme, such as, for example, resource allocation scheme designed for networks using cognitive radio, may be used in place of the resource allocation scheme described below, which is given by way of example only.

In some embodiments, radio resources may be allocated according to a scheme which takes as input the set of probabilities of transmission error PTE(j, v) for the N parallel communication links and all possible resources v that can be allocated to the radio transmission in the considered time window. While a probability of transmission error PTE(j, v) relates to a transmission on a communication link $CL_j$ using a resource of index v among all available resources, the probability transmission error PTE(j, rad_res (j, i)) described above relates to a transmission on the communication link $CL_j$ using the resource rad_res(j, i) which has been allocated for such transmission. The radio resource rad_res(j, i) can be seen as a specific value of the radio resource generic index v once the resource allocation has taken place and determined a set of radio resources rad_res(j, i) respectively allocated to transmissions on the communication link $CL_j$.

The radio resource allocation scheme may provide that n(j) radio resources rad_res(j, i) are respectively allocated for the j-th parallel communication link $CL_j$ so as to optimize a figure of merit which measures a probability of transmission error on the N parallel communication links, such as, for example, the above-described figure of merit $f(\{\{PTE(j, \text{rad\_res}(j, i))\}_{i=1,\ldots,n(j)}\}_{j=1,\ldots,N})$.

In some embodiments, the resource allocation optimization may be subject to radio resource allocation constraints, such as, for example, the assumption that one resource can be allocated only once, i.e., non-self interference is reached for the system, and/or the constraint not to allocate two radio resources for one parallel transmission in the same time slot.

It will be appreciated by those having ordinary skill in the relevant art that exact values of the probabilities of transmission error PTE(j, v) cannot in practice be known, and that in embodiments of the present subject disclosure estimates of those probabilities will be determined, with more or less accuracy depending on the embodiment. In the following, depending on the context, the notation PTE(j, v) will be indifferently used for designating a probability of transmission error or an estimated probability of transmission error. The output of the resource allocation scheme may be a number of resources n(j) allocated for the j-th parallel communication link $CL_j$, and the corresponding set of allocated resources $\{\text{rad\_res}(j, i)\}_{i=1,\ldots,n(j)}$, for which the value of the figure of merit is optimum.

In some embodiments, this optimization of the figure of merit may be performed using a function $g(\{\{PTE(j, v)\}_{v \in SOR}\}_{j=1,\ldots,N})$, where the set of indices of available resources is noted SOR, which is defined as the optimum over the set of available resources for allocation of a figure of merit, such as the one described above $f(\{\{PTE(j, \text{rad\_res}(j, i))\}_{i=1,\ldots,n(j)}\}_{j=1,\ldots,N})$. In other words, g gives an estimated optimum value of the figure of merit of the system given a known set of probabilities of transmission error for each parallel transmission and radio resources $\{\{PTE(j, v)\}_{v \in SOR}\}_{j=1,\ldots,N}$ in a given transmission window, where the radio resources have been allocated in order to optimize the figure of merit according to the chosen resource allocation algorithm.

In some embodiments, the function g may be defined by the following Equation 2, where the set of indices of available radio resources is noted SOR:

$$g(\{\{PTE(j,v)\}_{v \in SOR}\}_{j=1,\ldots,N}) = \text{Min}_{v \in SOR}[f(\{\{PTE(j,v)\}_{v \in SOR}\}_{j=1,\ldots,N})]$$

When using the above exemplary definition of the figure of merit $f(.)$, the definition of the function $g(.)$ becomes as follows:

$$g(\{\{PTE(j,v)\}_{v \in SOR}\}_{j=1,\ldots,N}) = \text{Min}_{v \in SOR}\left[1 - \prod_{j=1}^{N}\left[1 - \prod_{v \in SOR} PTE(j,v)\right]\right] \quad \text{Equation 3}$$

Depending on the embodiment, different optimization schemes can be implemented to determine the optimum resource allocation. It will be appreciated by those having ordinary skill in the relevant art that any suitable optimization algorithm, such as, for example, genetic algorithms, may be used in place of the optimum resource allocation determination schemes described below, which are given by way of example only.

In an embodiment, the optimum resource allocation may be determined by making an exhaustive list of all possible resource allocations among the parallel transmissions, computing for each selected allocation the figure of merit $f(\{\{PTE(j,v)\}_{v \in Selected\ Allocation}\}_{j=1,\ldots,N})$ and keeping the optimum one.

Alternatively, the optimum resource allocation may be determined by making a random list of possible resource allocations among the parallel transmissions, computing for each selected allocation the figure of merit $f(\{\{PTE(j,v)\}_{v \in Selected\ Allocation}\}_{j=1,\ldots,N})$ and keeping the optimum one.

As discussed above, in some embodiments radio resources may be allocated according to a scheme which takes as input the probabilities of transmission error PTE(j, v) for the N parallel communication links $\{CL_j\}_{j=1,\ldots,N}$ and all possible resources v in the considered time window.

The probability of transmission error for a communication link could be estimated at the transmitter by using knowledge on the transmission channel associated to each resource v. Once an estimation of PTE(j, v) is obtained, an estimate of $g(\{\{PTE(j,v)\}_{v \in SOR}\}_{j=1,\ldots,N})$ can be determined. Unfortunately, such knowledge may in some systems be very limited for fast moving wireless devices. Indeed, it is usually built by having a sounding of the radio channel at the receiver side on the considered resource v, and using a feedback mechanism to the transmitter. Depending on the implementation of the system, when considering a moving wireless device, the radio channel may change faster than the feedback periodicity, which deteriorates the performance, in particular the efficiency, of the feedback-based channel estimation techniques.

On the other hand, the long-term statistics of the transmission channel for a given location in the network may be assumed as being quite stable, i.e. low-varying in time or stationary, so that they may be used for a long time and updated, taking into account the fact that the transmission error rate varies as a function of the radio resource v used for the transmission and the location of the wireless device involved in the transmission.

Accordingly, in some embodiments, in order to predict the performance of a transmission (measured by a probability that a transmission error occurs, that is, that a transmission of a message using the radio resource v fails), an interference database may be built that stores an estimated distribution of the estimated probabilities of error transmission (of a message) PTE(j, v) for each potential location of a wireless device of the network (in the considered cell), and each frequency resource.

Alternatively, the interference database may store an estimated distribution of interferences for each potential location of a wireless device of the network (in the considered cell), and each channel.

Information stored in the interference database can in some embodiments be used for performing resource allocation according to the exemplary schemes described in the present subject disclosure. In such case, it may be advantageous to use the processing performed for resource allocation as well as information stored in the interference database for this purpose in the determination of the figure of merit. In this regard, it may also be advantageous for the system performance prediction to use the same resource allocation scheme for the system monitoring as for the system operational mode.

Each potential location of a wireless device of the network can also be associated with a time instant, a time slot, or a TTI, based on knowledge or an estimation of a trajectory of the wireless device, and a corresponding probability of transmission error can be evaluated. Indeed, as a radio resource r(j, i) corresponds to a frequency resource and a time resource (time instant, time slot, TTI) for performing during the time resource an i-th message transmission for the j-th parallel communication link $CL_j$, the time resource can be associated to a trajectory in order to determine a corresponding location. Such location in turn corresponds to a probability of transmission error stored in the interference database.

Depending on the embodiment, the set of potential locations of a wireless device of the network may be quantized into clusters of position, in which case the interference database may store an estimation of the transmission error distribution for each cluster and for each frequency resource.

Various formats of storage in the interference database for the estimated transmission error distribution may be used.

For example, parameters of a function corresponding to a given model of the transmission error distribution may be defined, and stored in the database. This provides the advantage of minimizing the amount of data in storage and facilitating the update of the database, as the initial measurements and subsequent updates of such parameters can be performed using measurement feedbacks which are part of a learning process to create and update the interference database as discussed below. For example, when a Gaussian distribution of the logarithm of probability of transmission errors is assumed, the average value and variance can be stored to fully describe the whole distribution.

Alternatively, the storage format of the transmission error distribution may be a histogram which can be regular (the bins have the same width), or irregular (the bin centers are stored along with their respective width). Since the histograms represent a distribution, it may be of interest to normalize the histogram so that the integral of the histogram representation is equal to one.

State of the art techniques can be used to perform statistical operations on a discrete distribution such as a histogram that lead to determining an estimate for corresponding operations performed on a continuous distribution, for example: computing the mathematical expectation of a function of the random variable according to the estimated discrete distribution, computing the cumulative density function, generating random realizations according to the estimated discrete distribution (from Monte Carlo sampling techniques, or Gibbs sampling for example). In the following, we will indifferently consider continuous or discrete representation of the estimated distributions and use, without limitation, the usual notations of continuous distributions (e.g., E( ) for mathematical expectation).

Differences in the antenna diagrams at the transmitter and the receivers, in their respective transmit powers, and in the interferers surrounding the receivers may impact the performance of the system for uplink transmissions as opposed to downlink transmissions. In some embodiments, such different performances depending on the type of each transmission (downlink or uplink) may be taken into account through the definition of different location clusters for downlink transmissions and for uplink transmissions. In other words, two clusters may be defined for a same geographical area, one corresponding to uplink transmissions from a wireless device location in the cluster, and the other corresponding to downlink transmissions to a wireless device located in the cluster. In these embodiments, a cluster corresponding to a given location may be selected of the given location and the downlink/uplink nature of the considered transmission to/from the wireless device situated at the given location.

Accordingly, given a location $x(j, i)$ of a wireless device and the downlink/uplink nature associated to the i-th transmission for the j-th parallel communication link $CL_j$, a corresponding cluster index u may be determined such that the location $x(j, i)$ belongs to the u-th cluster and the downlink/uplink nature of the i-th transmission for the j-th parallel communication link $CL_j$ occurring at the location $x(j, i)$ is respected.

An estimated distribution of the estimated probabilities of error transmission (of a message) $PTE(j, v)$ can be obtained by performing a learning process during which channel measurements are performed iteratively at a receiver for a j-th parallel communication link $CL_j$, corresponding cluster index u, and a resource index v. Depending on the embodiments, these channel measurements may output various channel quality metrics, such as an error rate, a signal to noise ratio (SNR), a signal to interference plus noise ratio (SINR), etc.

These channel measurements can be used for determining an estimate $CPTE(u, v)$ of the probability of transmission error $PTE(j, v)$ associated to the cluster u and resource v. Each of the $CPTE(u, v)$ can be seen as a realization of a random variable related to the probability of transmission error $PTE(j, v)$ using resource of index v in the cluster of index u. The set of $CPTE(u, v)$ can then be used to build and update an estimated distribution of the probabilities of transmission error for the cluster u and for the resource v, stored in some embodiments in the above-described interference database, for example by computing a histogram of the estimates $CPTE(u, v)$.

The obtained estimated distribution of the probabilities of transmission error for the cluster u and for the resource v, noted $epd(u, v, w)$, represents the probability to experience a probability of transmission (of a message) error $y(w)$ when the wireless device is located in cluster u and uses resource v, where y is a function (for the continuous model) or vector (for the histogram) of the probability of error for one transmission. Depending on the embodiment, the estimated probability distribution can be in the form of a set of histograms (u, v for the set, w for the bins) or a set of continuous functions (in which case u and v are discrete, not w).

In some embodiments, sets of estimated distribution of the probabilities of transmission error for different clusters and for different resources may be stored in the interference database, so that they can be extracted therefrom for determining an estimate of a figure of merit.

In some embodiments, the previously estimated probability distribution $epd(u, v, w)$ can be used to obtain, through the determined resource allocation function $g(\{\{Q(j, v)\}\})$ executed for $Q(j, v)$ which is a realization of a random variable (related to $PTE(j, v)$) following the estimated probability distributions $epd(u(j, i), v, w)$, and given a number of wireless devices and respective trajectories for these wireless devices, an estimate of the figure of merit.

Figure 3:
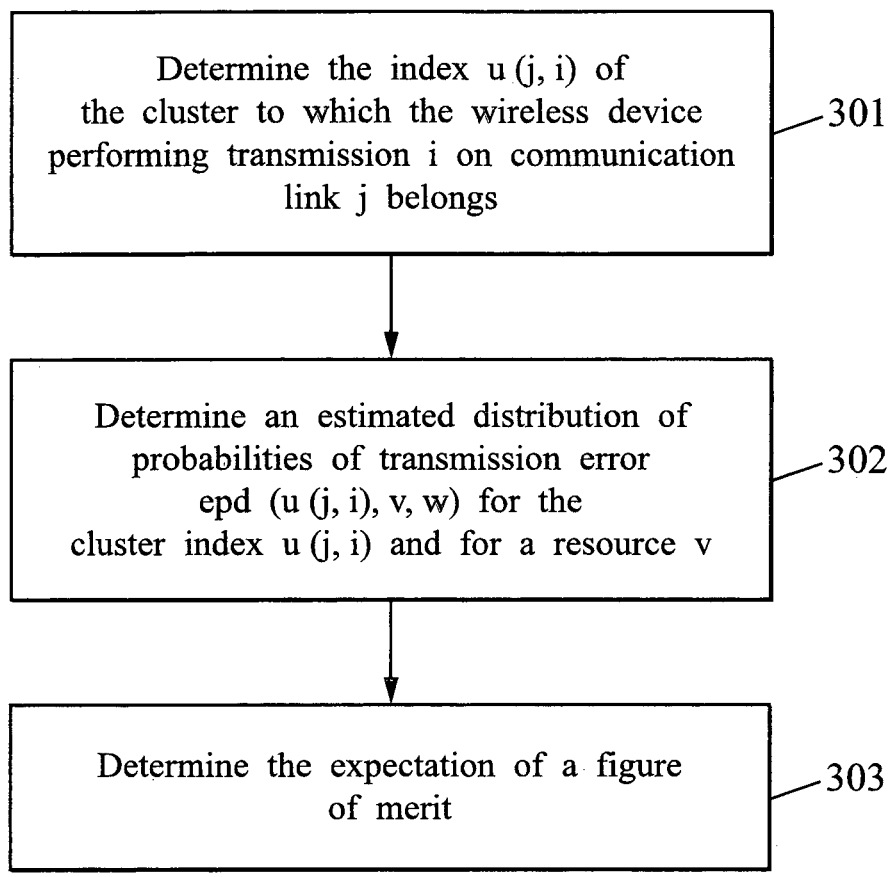
FIG. 3 is a flow chart illustrating an exemplary network monitoring process, in accordance with one or more embodiments.

FIG. 3 shows a flow chart illustrating an exemplary determination of an estimate of the figure of merit, in accordance with one or more embodiments.

For a given number $n(j)$ of transmissions (for example, considering all the resources belonging to an observation time window) for each parallel communication link $CL_j$, and each transmission i (i=1, . . . , n(j)), determine (301) the cluster index $u(j, i)$ to which the wireless device performing the transmission i belongs.

Once the index of the cluster to which the wireless device performing each transmission for each communication link belongs is determined, determine (302) an estimated distribution of the probabilities of transmission error for the cluster $u(j, i)$ and for the resource v, noted $epd(u(j, i), v, w)$, which represents an estimated distribution of a probability to experience a probability of transmission (of a message) error $y(w)$ when the wireless device is located in cluster $u(j, i)$ and uses resource v, where v is an index on the resources indexes in each cluster.

Using the estimated probability distributions $epd(u(j, i), v, w)$, for example extracted from the interference database, determine (303) the expectation of the figure of merit.

In some embodiments, the expectation of the figure of merit $g(.)$ may be determined by computing the expectation of $g(\{\{Q(j, v)\}\})$, that is, $E[g(\{\{Q(j, v)\}\})]$, where $Q(j, v)$ is a realization of a random variable (related to $PTE(j, v)$) following the estimated probability distributions $epd(u(j, i), v, w)$.

In some embodiments, the number N of communication links $\{CL_j\}_{j=1, \ldots, N}$ can be associated with the number of wireless devices in the considered area of monitoring of the system. Such is the case, for example, in CBTC systems for which a transmission model according to which N/2 trains each establish during the observation time window a communication link in the uplink, and a communication link in the downlink may be adopted, as described above.

Therefore, the performance of the system may be determined based on the estimated probability distribution $epd(u, v, w)$, given a number of parallel communication links (which can be derived from the number of wireless devices in the area of system monitoring), the respective trajectories of the wireless devices respectively associated with the communication links, and the resource allocation strategy.

The present subject disclosure proposes to monitor the system health using a set of random variables usable for characterizing a figure of merit determined over a time window, and comprising the transmission error distribution for each radio resource for each location, the number of wireless devices and their trajectories within the time window.

Figure 4:
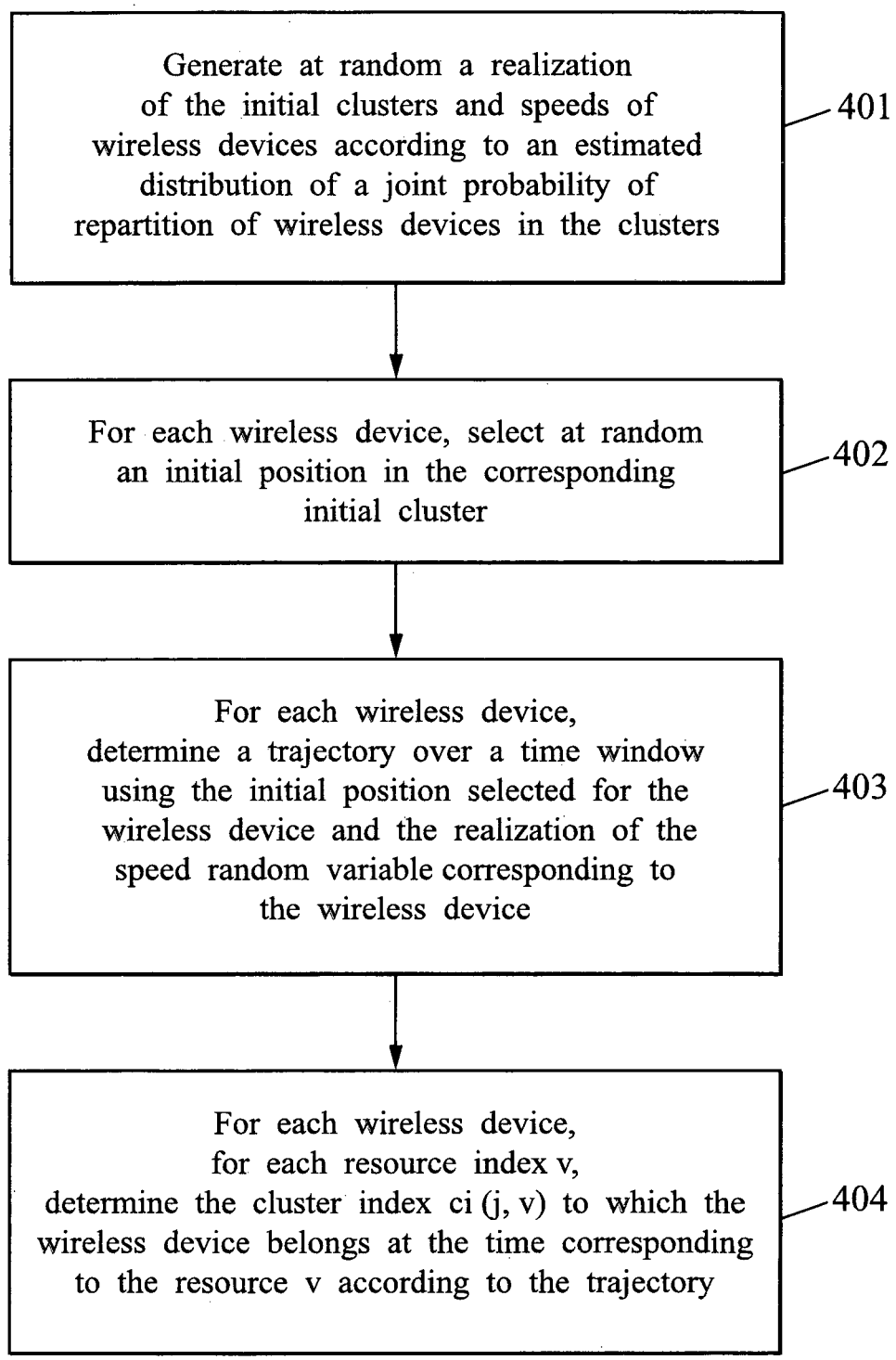
FIG. 4 is a flow chart illustrating an exemplary approximation of a distribution of wireless devices trajectories, in accordance with one or more embodiments.

FIG. 4 shows a flow chart illustrating an exemplary approximation of a distribution of wireless devices trajectories, in accordance with one or more embodiments.

The probability density function of the wireless device trajectories could be evaluated and updated from observations of the wireless devices moving in the system. However, the dimensionality of the problem is very high, and would therefore require a high number of measurements in order to obtain an estimate of a distribution of wireless devices trajectories with good accuracy.

Good accuracy can be achieved with a low number of measurements by considering trajectories of the wireless devices over a limited span observation time window (for example, of duration of 1 second). In addition, a simplified representation of a trajectory of a wireless device in a cell over an observation time window may be defined in some embodiments as a cluster index corresponding to the starting point of the trajectory (at the start of the observation time window), and the speed of the wireless device at this starting point.

In some embodiments, the distribution of wireless devices in a given cell of the system over an observation time window may be described using a random variable Init_Cluster representing the cluster in which a wireless device (among the wireless devices present in the cell during the observation time window) is located at the start of the observation time window, referred to as the "initial cluster" of the wireless device. The number of initial clusters will correspond to the number of wireless devices present in the cell at the start of the observation time window.

The representation of trajectories of wireless devices present in the cell at the start of the observation time window as realizations of a random variable can then consider the joint probability of two random variables, one being the random variable Init_Cluster representing the initial cluster, and the other representing the speed of the wireless device located in the initial cluster, noted Speed.

A distribution of the wireless devices present in the cell in the system may therefore be represented by a joint probability of repartition of wireless devices in the clusters JP_Traj({Init_Cluster}, {Speed}) defined over the set of cluster indexes. In this definition, {Init_Cluster} is a set of size |Init_Cluster| corresponding to a number of wireless devices present in the cell at the start of the observation time window, which contains (possibly sorted) initial cluster indexes. {Speed} is a set of the same size as {Init_Cluster} which contains speeds respectively corresponding to the wireless devices present in the initial clusters of the set {Init_Cluster}.

In some embodiments, an estimated distribution of the joint probability of repartition of wireless devices in the clusters JP_Traj({Init_Cluster}, {Speed}) may be acquired and updated by measurements on the cell. For example, the value JP_Traj({ }, { })=0.8 may be interpreted as meaning that 80% of the time, there is no wireless device in the considered cell at the start of the observation time window. The value JP_Traj ({1,2}, {10,20})=0.1 may be interpreted as meaning that the probability to have a first wireless device in cluster 1 at 10 km/h and a second wireless device in cluster 2 at 20 km/h is 10%.

In some embodiments, a complete trajectory of a wireless device over a time window can be represented by a sequence of clusters corresponding to respective positions of the wireless device at successive time slots, such as, in some embodiments, transmission time intervals.

In embodiments where the wireless devices follow respective predetermined paths, as such is the case, for example, for wireless devices onboard trains, the sequence of clusters representing a complete trajectory of a wireless device over a time window can be determined from the extrapolated positions of the wireless device at each transmission time interval along the predetermined path of the wireless device over the observation time window, based on the initial cell and the speed of the wireless device at the start of the time window.

Therefore, in some embodiments, the trajectory over a time window of each wireless device present in the cell at the start of the time window may be represented by a set of cluster indexes {ci(j, v)} of the clusters associated to each resource v for each parallel communication link j established between the wireless device and the network in the considered time window.

A realization of the cluster indexes {ci(j, v)} may in some embodiments be obtained as illustrated on FIG. 4.

A realization at random of the random variables Init_Cluster and Speed is generated (401) according to the estimated distribution of the joint probability of repartition of wireless devices in the clusters JP_Traj({Init_Cluster}, {Speed}).

As discussed above, the realization of the Init_Cluster random variable generates a set of initial clusters which corresponds to a set of wireless devices respectively present in the initial clusters. Each of these wireless devices also corresponds to one or more parallel communication links $CL_j$.

For each parallel communication links $CL_j$, an initial position of the corresponding wireless device within the corresponding initial cluster is selected (402) at random. Then a trajectory of the wireless device over the time window starting at this initial position is determined (403) using the realization of the Speed random variable corresponding to the wireless device.

For each wireless device and each possible resource index v within the considered time window, an index ci(j, v) of the cluster to which the wireless device belongs at the time corresponding to the v-th resource, is determined (404) according to the previously estimated trajectory for the wireless device.

Figure 5:
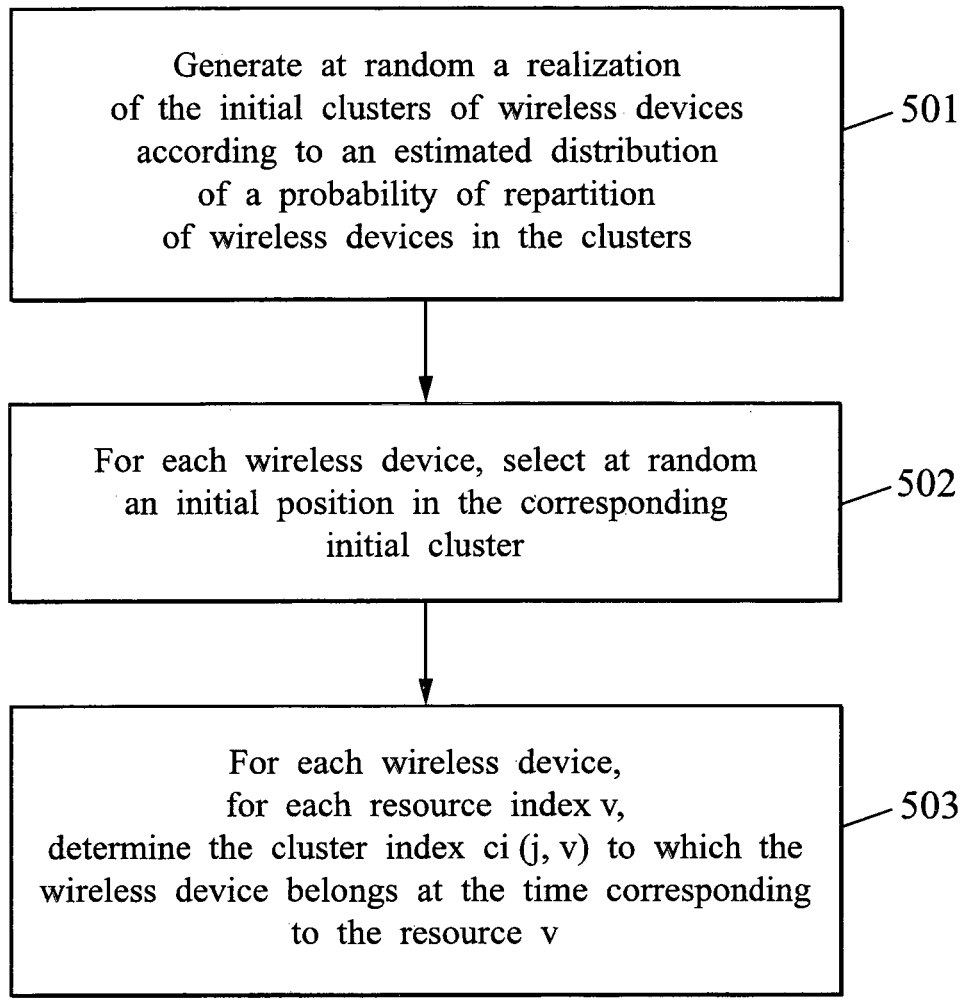
FIG. 5 is a flow chart illustrating an exemplary approximation of a distribution of wireless devices trajectories, in accordance with one or more embodiments.

FIG. 5 shows a flow chart illustrating another exemplary approximation of a distribution of wireless devices trajectories, in accordance with one or more embodiments.

In some embodiments, the approximation of a distribution of wireless devices trajectories may be further simplified by assuming that each wireless device stays in the same cluster during the observation time window.

This corresponds to an assumption that the wireless devices have a low speed, and considers worst case scenarios (higher speeds provide more robustness to interference).

In such case, the above described Speed random variable may be considered deterministic, and set to a zero value for each wireless device present in a cell over an observation time window.

Therefore, the probability density function of the wireless device trajectories can be represented by the distribution of the wireless device positions among the clusters and the number of wireless devices, which can be estimated, updated, and used to generate realizations of the initial cluster random variable Init_Cluster and determine realizations of the cluster indexes {ci(j, v)} as described above. It can be noted that under the assumption that the wireless devices don't change cluster over the observation time period, all the cluster indexes defining the trajectory of a wireless device j will be identical.

The joint probability of repartition of wireless devices in the clusters JP_Traj({Init_Cluster}, {Speed}) can be approximated in such case using the estimated probability distribution of the number of wireless devices in the cell, noted N(n) (n being the number of wireless devices), and using the estimated proportion of time spent by one device in cluster u, noted T(u) under the assumption that the positions of each wireless device in the cell are independent one from each other.

In some embodiments, an estimated joint probability of repartition of wireless devices in the clusters JP_Traj ({Init_Cluster}, {Speed}) can be approximated by using Equation 4:

$$JP\_Traj(\{Init\_Cluster\},\{Speed\}) = N(|Init_{Cluster}|)$$
$$\Pi_{a=1}^{|Init\_Cluster|} T(Init\_Cluster(a)) \quad \text{Equation 4:}$$

A realization of the cluster indexes {ci(j, v)} may in some embodiments be obtained using this estimated probability of repartition of wireless devices in the clusters JP_Traj ({Init_Cluster}, {Speed}) as illustrated on FIG. 5.

A realization at random of the random variable Init_Cluster is generated (501) according to the estimated distribution of the probability of repartition of wireless devices in the clusters JP_Traj({Init_Cluster}, {Speed}).

The realization of the Init_Cluster random variable generates a set of initial clusters which corresponds to a set of wireless devices respectively present in the initial clusters. Each of these wireless devices also corresponds to one or more parallel communication links $CL_j$.

For each parallel communication links $CL_j$, an initial position of the corresponding wireless device within the corresponding initial cluster is selected (502) at random.

For each parallel communication links $CL_j$ and each possible resource index v within the considered time window, the index ci(j, v) of the cluster to which the wireless device belongs at the time corresponding to the v-th resource, is determined (503).

Figure 6:
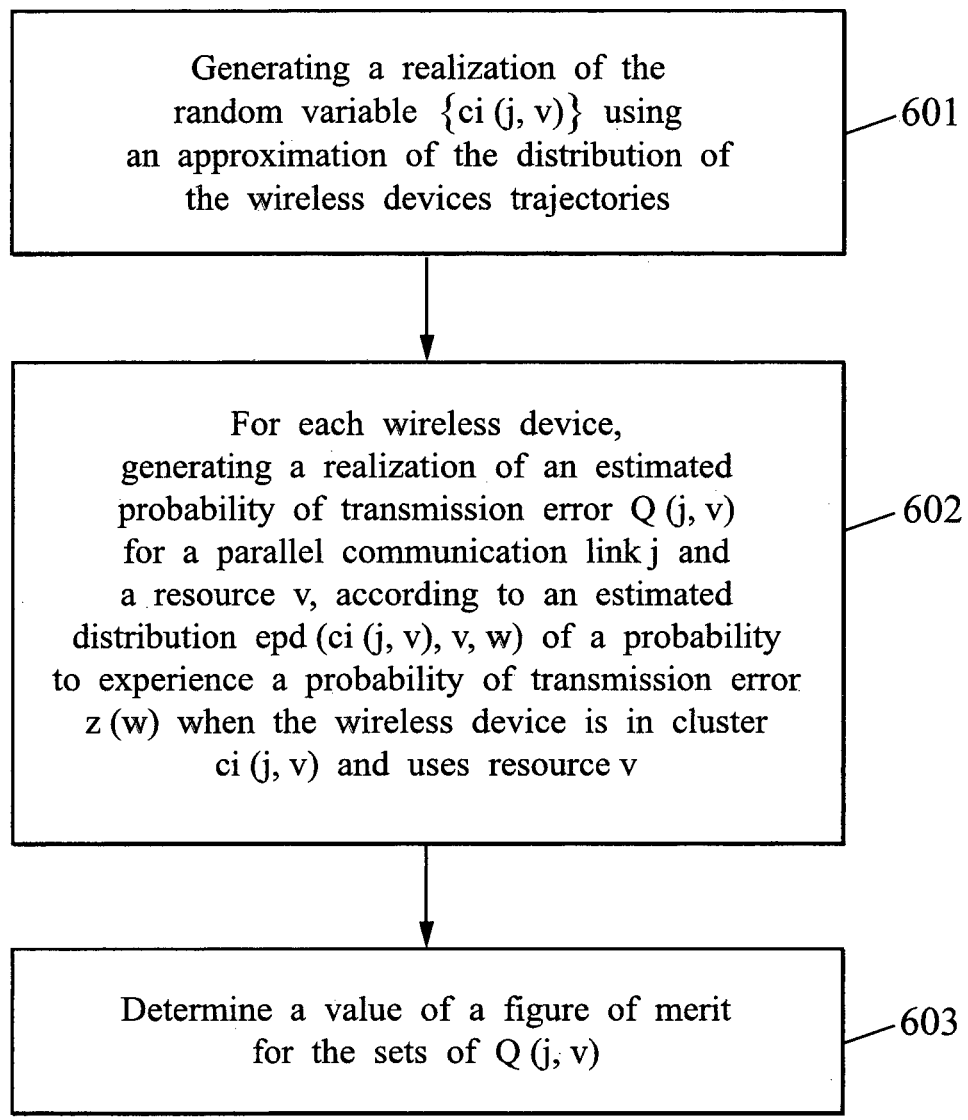
FIG. 6 is a flow chart illustrating an exemplary network monitoring process, in accordance with one or more embodiments.

FIG. 6 shows a method for monitoring transmission in a wireless network comprising a radio access infrastructure and wireless devices according to embodiments of the present subject disclosure.

An estimated number of wireless devices and an estimated trajectory for each wireless devices are generated by generating (601) a realization of the random variable {ci(j, v)} using an approximation of the distribution of the wireless devices trajectories as described above.

For each wireless device, an estimated probability of radio transmission error random variable Q(j, v) associated to the j-th parallel communication link and each radio transmission resource v is determined by generating (602) a realization of Q(j, v) according to the estimated distribution of probabilities of transmission epd(ci(j, v), v, w), which represents an estimated distribution of a probability to experience a probability of transmission (of a message) error y(w) when the wireless device is located in cluster ci(j, v) and uses resource v.

Once the probabilities of error transmission Q(j, v) on each resource v for each wireless device are selected at random, an estimate of a figure of merit of the wireless network is determined by determining (603) a value of the figure of merit function g(.) for the determined sets of Q(j, v), that is, g({{Q(j, v)}}).

In embodiments where the figure of merit function g(.) corresponds to the resource allocation scheme used in the wireless network, the determination of g({{Q(j, v)}}) may include executing the resource allocation algorithm for the sets of realizations {{Q(j, v)}}.

In some embodiments, an estimate of a distribution of the figure of merit may be obtained by performing several iterations of the process illustrated on FIG. 6. An estimate of a distribution of the figure of merit can then be obtained by various statistical methods for combining the distributions of random variable realizations, such as, for example, a Monte-Carlo simulation.

In the non-limiting context of CBTC networks, the figure of merit may be defined in some embodiments so as to represent a probability of train stop, that is, a probability that there is at least one transmission error for at least one train of the system during the observation time window.

In such case, the repeating iterations of the process described above and illustrated on FIG. 6 can be used to perform a Monte-Carlo simulation to build an estimated probability density function of the probability of train stop EPTS(pts), where pts is a probability of train stop for the system.

In some embodiments, an alert can be generated based on a comparison between a radio link quality measurement value and a predetermined threshold value, where the radio link quality measurement value is determined using the probability of train stop distribution EPTS(pts). An estimate expected time to the next error (train stop) can be computed using the probability of train stop distribution EPTS(pts), and a cumulative density function of the expected time to the next error can also be computed using EPTS(pts).

For example, the probability to have no errors within the next 20 years is a good indicator of the radio link quality. If this probability goes above a given threshold (e.g., 10%), an alert may be generated to the operator of the CBTC network.

The alert generated can take various forms depending on the embodiment, such as, for example, a message, a signal, and/or a display on an operator's screen, etc.

For example, if the length of the observation time window based on which a train stop is defined is TWL, then a target probability of train stop TPTS can be computed as TPTS=TWL/TWTS, where TWTS is the target time without train stop (e.g., 20 years or around 0.63e9s).

The higher the number of trains in a cell, the less the amount of resource which can be allocated to each train communication, and the less robust each transmission is to the interference. Therefore, one way to improve the robustness to interference is to limit the number of trains in the cell. Limiting the number of trains in the cell can be done by adapting the cell coverage or by adapting the train traffic in the cell. The first option is a long-term approach, while the second option can be a reactive one. Robustness to interference in the cell is enhanced in some embodiments by determining a critical number of trains in the cell using the probability of train stop distribution EPTS(pts).

Depending on the embodiment, the distribution of the probability of train stops may be stored according to the number of trains in the cell, and the contribution of each number of trains in a target train stop performance (e.g., a target probability of train stop, such as one train stop every 20 years) decomposed. This allows for computing the critical number of trains that achieves the requested performance, and informing the operator. The train traffic can then be adapted from this information.

In some embodiments, a Monte Carlo simulation may be used for estimating the critical number of trains. The method of determining an estimate distribution of wireless devices described above and illustrated in FIG. 5 may be advantageously used as it would separate the random number of trains from their respective positions in the cell. When computing the estimate of a figure of merit for the determined sets of Q(j, v), that is, g({{Q(j, v)}}), such value g({{Q(j, v)}}) may be stored in a memory dedicated to said random number of trains. Then, the probability of having a train stop probability equal to the target probability of train stop TPTS may be computed for each maximal number of train, and the one falling beyond a pre-determined threshold (e.g., 10%) may define the critical number of trains In some severe interference situation, a given location can jeopardize the performance of the entire system. For this reason, it may be of interest to determine these localized interference locations, and to highlight them to the network operator that can either try to identify and solve the problem on site (for example find devices illegally using the ISM band, e.g., not respecting the standard duty cycle), or deploy a new network access point for boosting the system performance at such locations.

However, if a cluster has a high density of wayside interferers but trains usually go fast in that cluster, then the impact of such wayside interferers on the system overall performance is low (because speed is a good protection against wayside interference). On the other hand, if one cluster has an average level of interference, but the train usually stops there and possibly far away from the nearest WRU, then the impact of this cluster in the train stops may be high. Furthermore, if the cell is highly loaded in general, this further binds the CBTC radio performance. Thus, the critical positions are not only given by the interference lying around, but also by other performance factors. This can be remedied by extracting critical positions, that is, positions where the system performance is low, from the probability density function of the train stops.

In some embodiments, the distribution of the probability of train stops may be stored along with the clusters involved in ci(i, j). The contribution of each cluster may then be evaluated, for example using marginalization techniques, and clusters identified as critical from the standpoint of local performance may be highlighted to the network operator. Corrective solutions can then be implemented in the network, such as redefining the coverage/hand-over of the cell, or deploying a new WRU.

When computing the estimate of a figure of merit for the determined sets of Q(j, v), that is, g({{Q(j, v)}}), such values g({{Q(j, v)}}) may be stored in a memory dedicated to each cluster appearing in ci(i, j), with a weight being the ratio of appearance of said cluster in ci(i, j). Alternatively, for each realization of value g({{Q(j, v)}}), it is stored in a memory dedicated to each cluster appearing in the associated realization of ci(i, j), while a 0 value is stored in a memory to each cluster not appearing in the associated realization of ci(i, j). Then, the probability of having a train stop probability equal to the target probability of train stop TPTS can be computed for each cluster, and sorted to highlight the most critical clusters.

In other embodiments, marginalization techniques may be used to isolate other parameters, such as the joint knowledge of the involved clusters and the number of trains In other embodiments, one may take into account the train speed and give indications on the minimal speed recommended to be through a cluster. If a discrepancy is detected between this decision and the typical speed in the cluster, then this may require another type of counter-measure, such as deploying a new access point.

Referring back to FIG. 1, the server 15 may implement a wireless network monitoring function in accordance with embodiments of the present subject disclosure. It will be appreciated by those having ordinary skill in the relevant art that the methods of the present subject disclosure may be implemented in any other suitable manner, such as, for example, in an operation and maintenance (O&M) center of a wireless network.

Figure 7:
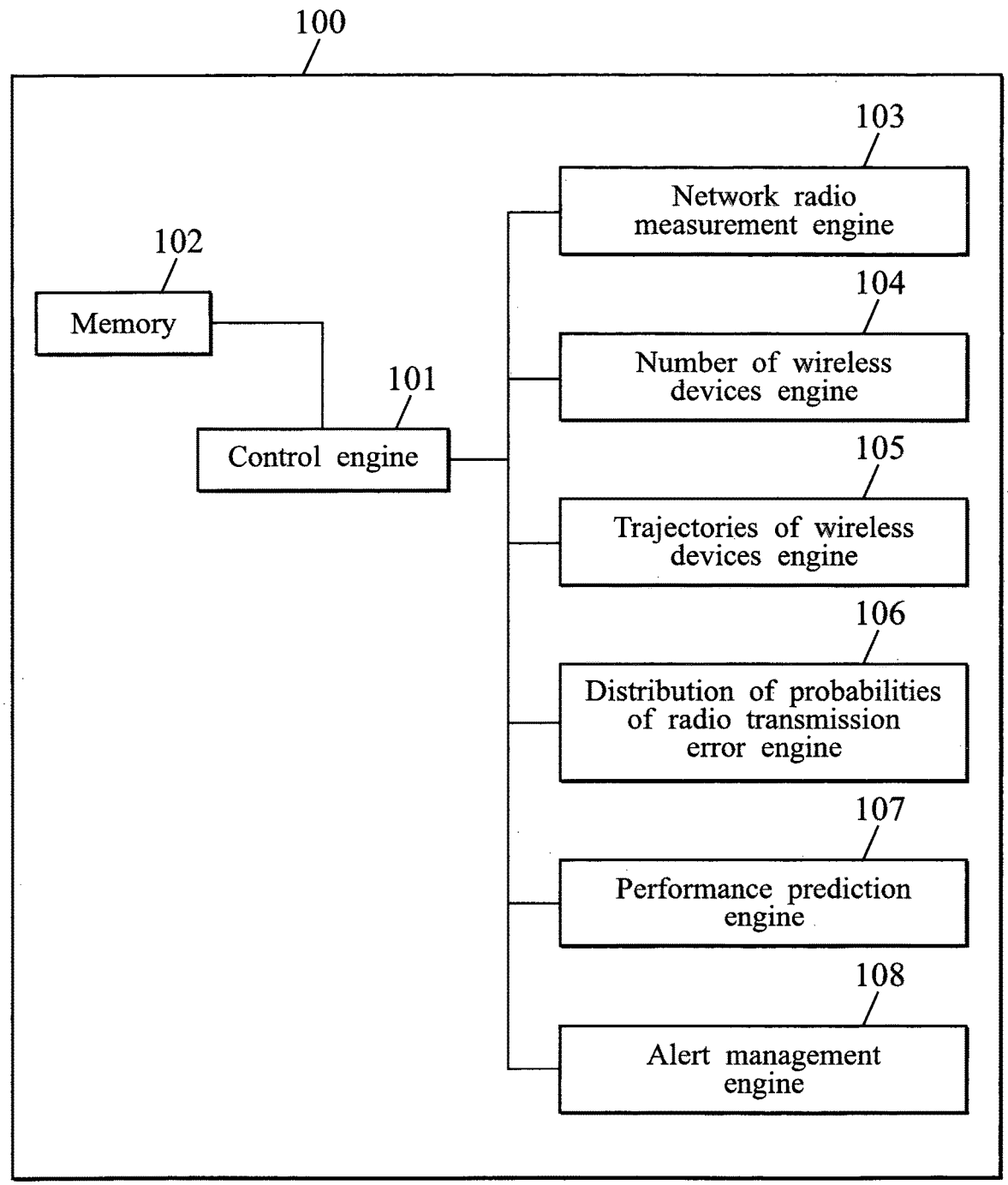
FIG. 7 is a block diagram illustrating exemplary functionality of a network node, in accordance with one or more embodiments.

FIG. 7 illustrates an exemplary network node 100 configured to implement a wireless network monitoring feature in accordance with embodiments of the present subject disclosure.

The network node 100 includes a control engine 101, a network radio measurement engine 103, a number of wireless devices engine 104, a trajectories of wireless devices engine 105, a distribution of probabilities of radio transmission error engine 106, a performance prediction engine 107, an alert management engine 108, and a memory 102.

In the architecture illustrated on FIG. 7, all of the network radio measurement engine 103, number of wireless devices engine 104, trajectories of wireless devices engine 105, distribution of probabilities of radio transmission error engine 106, performance prediction engine 107, alert management engine 108, and memory 102 are operatively coupled with one another through the control engine 101.

The network radio measurement engine 103 may provide a radio measurement function which processes (including stores in memory 102) radio measurements received from wireless devices or wireless infrastructure nodes. The radio measurements received by the network radio measurement engine 103 may include information related to radio transmission error, a radio transmission error rate, and/or measurement of any other radio link quality parameter, such as a SNR, a SINR, etc. Such radio measurements may be used by the distribution of probabilities of radio transmission error engine 106.

The number of wireless devices engine 104 may provide a number of wireless devices estimation function, for generating an estimated number of wireless devices according to a predetermined profile, such as an estimated probability distribution.

The trajectories of wireless devices engine 105 may provide a trajectories of wireless devices estimation function, for generating respective estimated trajectories of wireless devices according to a predetermined profile, such as an estimated probability distribution.

The distribution of probabilities of radio transmission error engine 106 may provide a distribution of probabilities of radio transmission error estimation function, for determining an estimated distribution of the probabilities of radio transmission error during a time window for each wireless device of the estimated number of wireless devices. As described above, this may entail in some embodiments determining an estimated distribution epd(u(j, i), v, w) of a probability to experience a given probability of transmission error y(w) when the wireless device is located in cluster u(j, i) and uses resource v, for an i-th message transmission on communication link j between the wireless device and the network infrastructure.

The performance prediction engine 107 may provide a performance prediction estimation function, for determining an estimate of a figure of merit of the wireless network based on respective estimated distributions of the probabilities of radio transmission error during the time window for the wireless devices.

The alert management engine 108 may provide an alert management function for computing values of a critical parameter of the network (e.g. a target probability of transmission error over an observation time window (a target probability of train stop for CBTC networks), a maximum number of wireless devices (trains in a CBTC network) in a cell for a given target probability of transmission error) and comparing such values with a threshold for generating an alert to the network operator.

The control engine 101 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. The control engine 101 may also comprise, or may be in communication with, computer storage media, such as, without limitation, the memory 102, capable of storing computer program instructions or software code that, when executed by the processor, cause the processor to perform the elements described herein. In addition, the memory 102 may be any type of data storage computer storage medium coupled to the control engine 101 and capable of storing radio measurement results during the learning phase and/or an interference database as described herein for some embodiments.

It will be appreciated that the network node 100 shown and described with reference to FIG. 7 is provided by way of example only. Numerous other architectures, operating environments, and configurations are possible. Other embodiments of the node may include fewer or greater number of components, and may incorporate some or all of the functionality described with respect to the network node components shown in FIG. 7. Accordingly, although the control engine 101, network radio measurement engine 103, number of wireless devices engine 104, trajectories of wireless devices engine 105, distribution of probabilities of radio transmission error engine 106, performance prediction engine 107, alert management engine 108, and memory 102 are illustrated as part of the network node 100, no restrictions are placed on the location and control of components 101-108. In particular, in other embodiments, components 101-108 may be part of different entities or computing systems.

While the invention has been described with respect to preferred embodiments, those skilled in the art will readily appreciate that various changes and/or modifications can be made to the invention without departing from the spirit or scope of the invention as defined by the appended claims.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

INDUSTRIAL APPLICABILITY

These inventions of this application are applicable to wireless networks in various kinds of fields.

The invention claimed is:

1. A method for monitoring transmission in a wireless network comprising a radio access infrastructure and wireless devices, the method comprising:
   generate an estimated number of wireless devices according to a predetermined distribution of number of wireless devices;
   generate an estimated trajectory of each of the estimated number of wireless devices according to a predetermined distribution of trajectories;
   for each wireless device of the estimated number of wireless devices, determine an estimated distribution of the probabilities of radio transmission error during a time window using the estimated trajectory of the wireless device;
   determine an estimate of a figure of merit of the wireless network based on the respective estimated distributions of the probabilities of radio transmission error during the time window for the wireless devices; and
   determining an estimate of a distribution of the figure of merit by iterating the above method, wherein the wireless network is comprised in a Communication Based Train Control, CBTC, system, and the wireless devices are onboard trains, the method further comprising: determining an estimate probability of train stop distribution based on the estimate of a distribution of the figure of merit, wherein a train stop is triggered for an occurrence of a radio transmission error in the wireless network during the time window.

2. The method according to claim 1, wherein the length of the time window is between 0.5 second and 2 seconds.

3. The method according to claim 1, wherein the determining an estimate of a figure of merit of the wireless network comprises:
   generate an estimated probability of radio transmission error during the time window according to the estimated distribution of the probabilities of radio transmission error during the time window; and
   execute a resource allocation algorithm used to allocate resources in the wireless network on the generated estimated probability of radio transmission error during the time window.

4. The method according to claim 1, further comprising: determining an estimate of a distribution of the figure of merit by iterating the method of claim 1.

5. The method according to claim 1, wherein the determining the estimate of a number of wireless devices is based on an estimate of a probability density function model of the number of wireless devices.

6. The method according to claim 1, wherein the determining the respective estimates of trajectory is based on an estimate joint probability density of the position and speed of each of the wireless devices.

7. The method according to claim 1, where the determining the respective estimates of trajectory is based on a distribution of trajectories according to which the location of each mobile unit remains the same over the time window.

8. The method according to claim 1, wherein the figure of merit measures a probability of occurrence of a radio transmission error in the wireless network during the time window.

9. The method according to claim 1, further comprising: determining an estimate probability distribution of an expected time to the next train stop, computing a target probability of train stop value using the estimate probability distribution of an expected time to the next train stop, and generating an alert responsive to the target probability of train stop value being beyond a predefined threshold value.

10. The method according to claim 1, further comprising: determining an estimate probability distribution of an expected time to the next train stop, computing a target probability of train stop value using the estimate probability distribution of an expected time to the next train stop, and determining a critical number of trains for which a probability of having a train stop probability equal to the target probability of train stop value is beyond a predefined threshold value.

11. A network node in a wireless network comprising a processor, a memory, operatively coupled to the processor, wherein the network node is configured to perform a method for monitoring transmission according to claim 1.

12. A non-transitory computer-readable medium embodied thereon a program executable by a computer for performing a method, comprising computer program code, said computer program code comprising instructions to, when provided to a computer system and executed, cause said computer system to perform a method for monitoring transmission according to claim 1.

* * * * *